Sept. 6, 1938.  L. GILGENBACH  2,129,574
CLUTCH CONTROLLING TRACTOR HITCH
Filed June 2, 1937  2 Sheets-Sheet 2
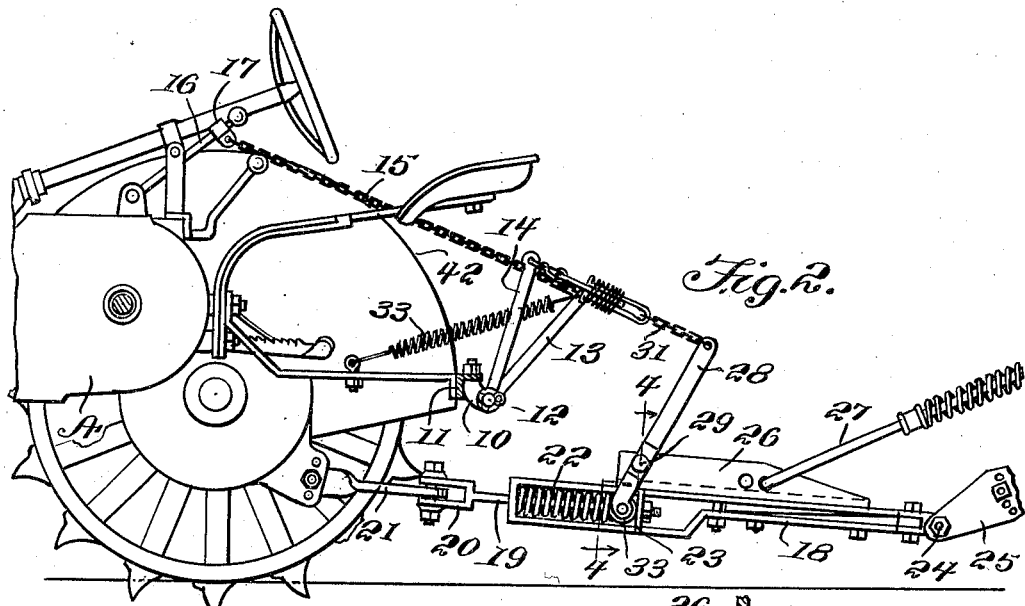
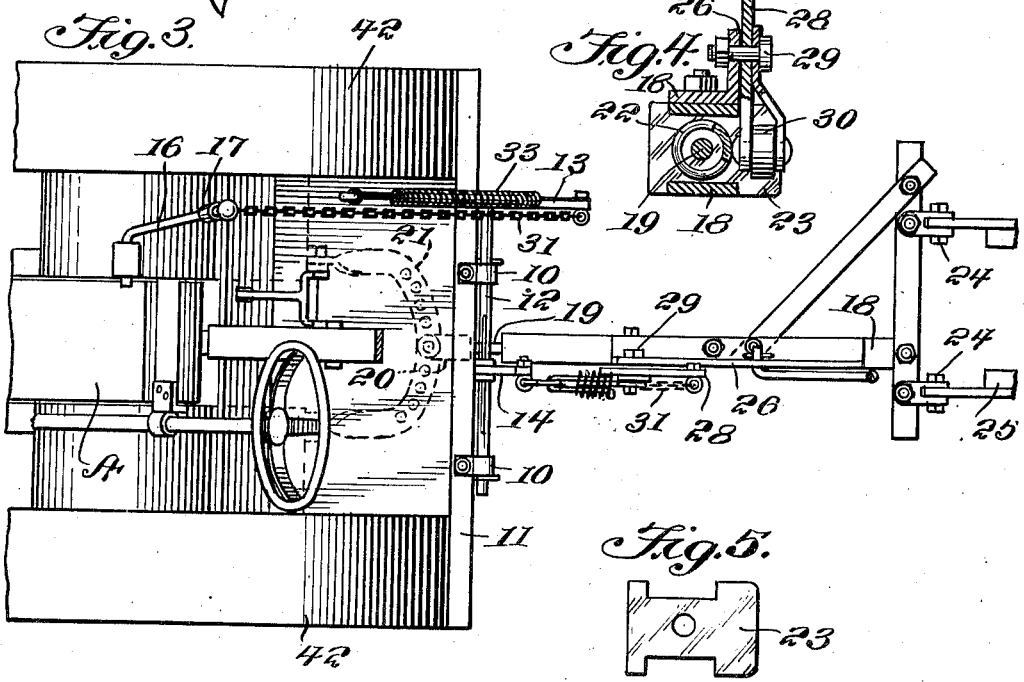
Leo Gilgenbach
INVENTOR
BY Victor J. Evans & Co.
ATTORNEYS
WITNESS J. T. L. Wright Patented Sept. 6, 1938

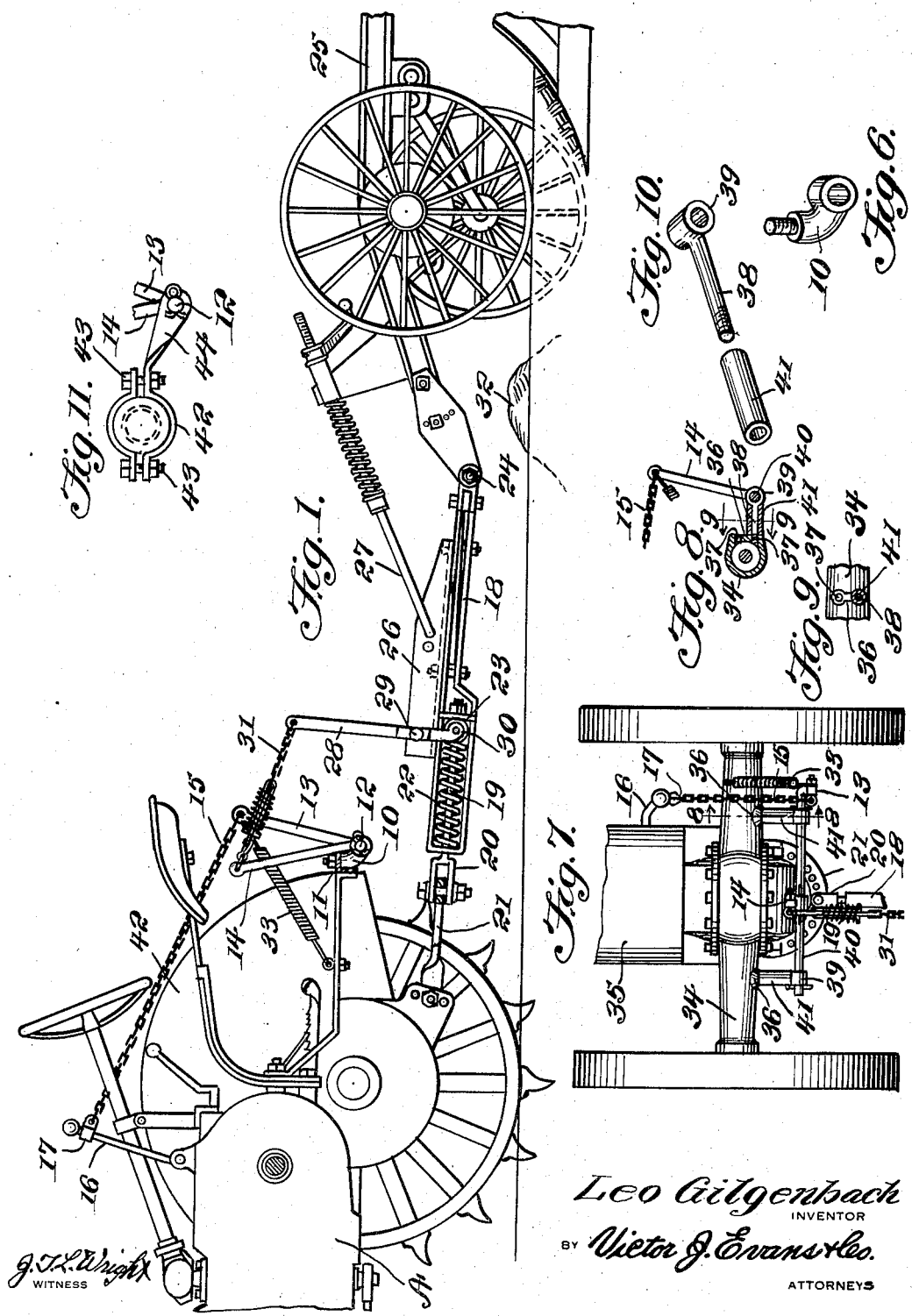

2,129,574

UNITED STATES PATENT OFFICE 2,129,574

CLUTCH CONTROLLING TRACTOR HITCH

Leo Gilgenbach, Malone, Wis.

Application June 2, 1937, Serial No. 146,062

2 Claims. (Cl. 180—145)

The invention relates to a vehicle hitch and more especially a clutch controlling tractor hitch.

The primary object of the invention is the provision of a hitch of this character, wherein in the use of a tractor for the draft of agricultural machinery, should the latter meet an obstruction or stress embodied thereon, the hitch will automatically actuate the clutch of the tractor drawing such machinery and thus stopping these in the further draft thereof.

Another object of the invention is the provision of a hitch of this character, wherein the same is of a construction that permits the use thereof with varying types of agricultural machines and tractors for the draft of such machines, the hitch being automatic in the working of the same to relieve stress upon the machine when being drawn and in this fashion avoiding damage thereto.

A further object of the invention is the provision of a hitch of this character, which is simple in its construction, thoroughly reliable and effective in operation, automatic in the working of the same, strong, durable, readily adjustable, and inexpensive to manufacture and install.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is a fragmentary side elevation of a tractor and agricultural machine with the hitch constructed in accordance with the invention applied thereto.

Figure 2 is a fragmentary side elevation similar to Figure 1 showing the hitch automatically actuated for the release of the clutch in the tractor when the agricultural machine meets an obstruction under draft thereof.

Figure 3 is a top plan view.

Figure 4 is an enlarged sectional view taken on the line 4—4 of Figure 2 looking in the direction of the arrows.

Figure 5 is a plan view of a follower plate used in the hitch.

Figure 6 is a perspective view of one of the hangers employed in the hitch.

Figure 7 is a fragmentary rear elevation of a different form of tractor showing a slight modification of the hitch applied thereto.

Figure 8 is a sectional view on the line 8—8 of Figure 7.

Figure 9 is a sectional view on the line 9—9 of Figure 8 looking in the direction of the arrows.

Figure 10 is an exploded perspective view of one of the hangers for the modified form of hitch.

Figure 11 is a fragmentary side elevation of a modified form of a hanger for use with the hitch.

Similar reference characters indicate corresponding parts throughout the several views in the drawings.

Referring to the drawings in detail, particularly Figures 1 to 6, the hitch in its preferred embodiment constituting the present invention comprises a pair of hangers, each indicated at 10, these of the pair are bolted or otherwise secured in spaced relation to each other to a cross angle bar 11 carried transversely of a tractor, a portion being indicated at A at its rear end. These hangers 10 of the pair have journaled therein a rocking shaft 12 supporting a pair of levers 13 and 14, respectively. The lever 13 through a length of chain 15 connected therewith operates and controls a clutch lever 16 on the tractor A, the length of chain 15 being engaged with the lever 16 by a coupling collar 17 while the other end of said chain is linked to the lever 13.

The hitch frame 18 forming a trailer bar has fitted therein a slidable plunger 19 forming a draft bar which is located at the end of the said frame 18 next to the tractor A and this plunger is formed with a coupling clip 20 separably pivoted or coupled with a draft link 21 adjustably fitted to the tractor A at its rear end. Surrounding the plunger 19 and within the frame 18 is a coiled compression spring 22, one end being fixed relative to the frame 18 and the other end working against a follower plate 23 slidably fitted in the frame, the plate 23 being fixed to the plunger 19.

The frame 18 at the rearmost end thereof has coupling at 24 with an agricultural machine, a portion being indicated at 25.

The frame 18 carries an upstanding rib 26 with which is adjustably and yieldably connected a suspension hanger 27 fitted with the agricultural machine 25, the hanger being adjusted in any desirable manner and is yieldable to a rise and fall of the hitch in the working thereof when hitching the machine 25 to the tractor A for the draft of said machine.

Swingingly connected with the rib 26 on the frame 18 is a rocking lever 28, the pivot being indicated at 29 for the swinging movement of the said lever 28. This lever 28 at its lower end carries a friction roller 30 having contact with the follower plate 23 which is slidably mounted in the frame 18 and acted upon by the spring 22. The upper end of the lever 28 has linked thereto a coupling chain 31, which is separably coupled with the lever 14.

In the operation of the hitch when the machine 25 under draft by the tractor A meets an obstruction, as, for example, at 32 in Figure 1 of the drawings, the continued advancement of the tractor A causes a relative displacement of the frame 18 and the plunger 19 wherein the spring 22 becomes compressed and the plate 23 being engaged with the roller 30 on the lever 28 causes a rearward tilting or swinging to this lever which through the coupling chain 31 actuates the lever 14 whence by the chain 15 the clutch lever 16 is operated for the opening of said clutch and thus stopping the tractor under draft and in this manner avoiding any damage to the machine during draft thereof.

The lever 13 has connected therewith a coiled retractile spring 33 which is connected to the tractor A and when the obstruction interferring with the machine 25 under draft is removed the said spring 33 returns the lever 14 as well as the levers 13 and 28 to normalcy or original position and the clutch lever 16 can be manipulated by the operator of the tractor A or the clutch lever 16 may automatically move to a position for the closing of the clutch of the tractor.

In Figures 7, 8 and 9 of the drawings there is shown a slight modification of the invention, wherein the rear axle housing 34 of a tractor 35 has formed thereon raised flat faced bearings 36, each having threaded sockets 37 for selectively accommodating eye bolts 38, the eyes 39 of which form bearings for a turning shaft 40 which is the equivalent of the shaft 12. The eye bolts 38 each carries a sleeve 41 which surrounds the same and abuts the bearing 36 and the journal eye 39 for uniformly spacing the eye bolts 38 with relation to the housing 34 of the tractor 35. In this manner the shaft 40 is fitted with the housing 34 of the type of tractor 35 differentiated from the type of tractor A hereinbefore described and illustrated in the drawings.

The tractor A has the rear traction wheel fenders or guards 42 while the tractor 35 is devoid of fenders or guards.

In Figure 11 of the drawings there is shown a further modification of hanger for use in connection with fenderless tractors and wherein there is involved a split clip 42', its sections being held together by nut carrying bolts 43 and one of these sections of said clip is provided with an extension 44 for accommodating the rocking shaft 12 supporting the pair of levers 13 and 14, respectively, there being a pair of these hangers employed and the same are adapted to embrace the rear axle housing of the tractor for the mounting of the said shaft 12 and the levers 13 and 14 associated therewith. This modified type of hanger is designated for fenderless tractors devoid of the bearings 36 provided with the threaded sockets 37 for accommodating eye bolts hereinbefore described.

What is claimed is:

1. In a hitch device for a tractor and trailing implement having relatively movable draft connections between the same and also said tractor having a clutch release driving means, a guide formed in one of said connections, an abutment plate fixed to the other connection and operating in said guide, a hanger on the tractor, a rocking shaft journaled in said hanger, levers reversely angled to each other with respect to the vertical and fixed to said shaft, a connection between one of the levers and the clutch release driving means, a rocking lever swingingly supported on the connection having the guide and engageable with the abutment plate, an adjustable connection between the other of the first-mentioned levers and the last-named lever, and an adjustable and yieldable suspension hanger on the trailing implement and engaged with the connection having the guide.

2. A hitch device for tractor and trailer elements, the combination with relatively slidable tractor and trailer bars, of a follower plate carried by the tractor bar, a spring fitted between said bars for tensioning the relative movements thereof, means acted upon by the follower plate for controlling a clutch lever of the tractor element, a yieldable and adjustable support on the trailer element for the trailer bar, and means for connecting the tractor and trailer bars with the said tractor and trailer elements, respectively.

LEO GILGENBACH.